INVENTOR.
HENRY P. KIRCHNER
BY Popp and Sommer
ATTORNEYS.

United States Patent Office 3,126,349
Patented Mar. 24, 1964

3,126,349
LOW EXPANSION CERAMIC ARTICLE
Henry P. Kirchner, Williamsville, N.Y., assignor to Cornell Aeronautical Laboratory, Inc., Buffalo, N.Y., a corporation of New York
Filed Apr. 24, 1961, Ser. No. 105,206
4 Claims. (Cl. 252—301.1)

This invention relates to ceramic bodies, and more particularly to a ceramic article having a low thermal expansion coefficient.

In accordance with the present invention, a new composition of material is provided which comprises a mixture in the solid state of uranium dioxide ($UO_2$) and uranium phosphate ($UP_2O_7$). It has been found that all compositions of such mixture between substantially pure uranium dioxide and substantially pure uranium phosphate have an unusually low thermal expansion coefficient. An article made of such a composition when subjected to temperature variation will not develop thermal stresses which lead to fracture of the article.

Such compositions may be utilized for nuclear reactor fuel elements or for other nuclear reactor applications. When the composition is used as a nuclear reactor fuel element, the development of thermal stresses therein will be reduced to avoid break up of the element when subjected to temperature change. Moreover, thermal expansion matching can be achieved. Thus, if the composition is used as a nuclear reactor fuel element, the thermal expansion coefficient of one layer of fuel operating at a given temperature can be matched to another fuel layer operating at a different temperature, by adjusting the proportions of uranium dioxide to uranium phosphate in each fuel layer. Also, where the composition is used as a nuclear reactor fuel element clad with another material the proportions of the composition ingredients may be adjusted to provide a fuel element having a thermal expansion coefficient which matches that of the material of which the cladding is composed.

Further, inasmuch as the uranium phosphate has a very open structure on an atomic scale, the composition of uranium phosphate and uranium dioxide will have an open structure useful for the storage and retention of fission products which will prevent distortion or rupture as in the case of materials not having an open structure.

Still further, enriched uranium, that is, uranium containing greater than natural amounts of $U^{235}$, may be placed in the uranium phosphate portion of the fuel element body. Such enriched material containing the $U^{235}$ will give off a greater fraction of fission products than the natural uranium. By placing the enriched uranium in the uranium phosphate greater advantage is taken of the fission product storage and retention capabilities of the uranium phosphate.

Accordingly, the primary object of the present invention is to provide a low expansion ceramic body which has useful application in nuclear reactors.

Figure 1:
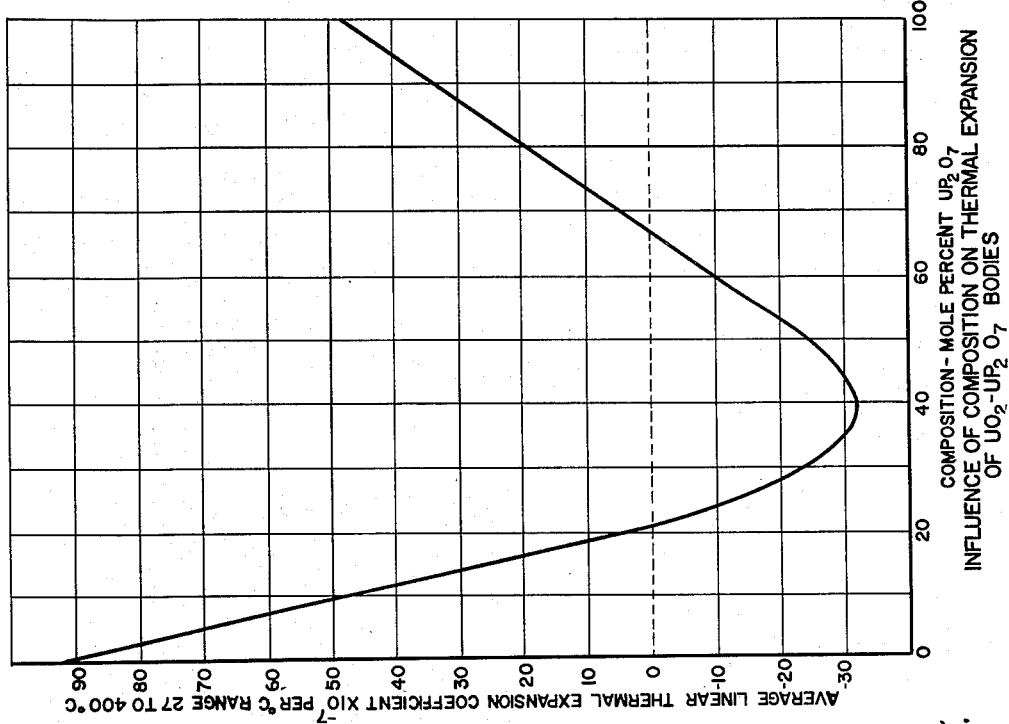
FIG. 1 is a graph showing the influence of composition on the thermal expansion properties of ceramic articles comprising a mixture of uranium dioxide and uranium phosphate.

Uranium phosphate is a low expansion material. Its coefficient of expansion is positive at lower temperatures, in the range of from 27° to approximately 400° C., and negative at higher temperatures, in the range of from 400° C. to at least 1200° C. This change in sign of the coefficient, from positive at lower temperature to negative at higher temperature, occurs without a change in phase, which is an unusual behavior. This low expansion of uranium phosphate has attractive usefulness for nuclear processes.

Uranium dioxide is a compound much used as a solid fuel element in nuclear reactors. Uranium dioxide has a relatively high coefficient of expansion which is a disadvantage in nuclear processes inasmuch as the relatively high temperature environments inherent in many nuclear processes can result either in thermal stresses which might cause mechanical failure or design difficulties.

In accordance with the present invention, it has been found that the thermal expansion of composites constituted of sintered mixtures of uranium dioxide and uranium phosphate have advantage over either pure material. Moreover, the atomic structure of uranium phosphate has a large amount of open space in the sense that the sum of the volumes of the individual ions is significantly less then the volume of the total structure. This open space can be used to store and retain fission products, a consideration which is often important in nuclear materials.

Uranium phosphate exists in both the orthorhombic and cubic crystallographic forms. Uranium phosphate for the practice of the present invention was prepared by mixing $(NH_4)_2HPO_4$ and $UO_2(NO_3)_2 \cdot 6H_2O$ in a molar ratio of 2:1 and heating this mixture in a porcelain receptacle over a burner for five hours. The mixture was then heated in a muffle kiln to 970° C. over a six-hour period. The resulting reaction product was comminuted in an aluminum oxide mortar to pass a 100 mesh screen and identified as cubic uranium phosphate containing traces of the orthorhombic form.

A series of thermal expansion specimens was prepared in which comminuted uranium phosphate and uranium oxide were blended in the proportions of 20, 40, 60 and 80 mole percent uranium phosphate. The preparation of the specimen compositions included the steps of weighing the ingredients in the prescribed amounts and ball milling the mixture to obtain uniform blending. The thermal expansion specimens themselves were prepared by adding 15 percent by weight Carbowax-methyl cellulose liquid binder to the various mixtures, reblending and baking in an oven at 130° C. to drive off water, then passing the residue through a 16 mesh screen. The screened mixtures were then cold pressed in a steel die under a nominal pressure of 570 kilograms per square centimeter into specimens with nominal dimensions, 110 millimeters long, 11 millimeters wide and 5 millimeters thick. These green compacts were then sintered in an argon atmosphere at 1200° C. for four hours. Following sintering, the specimen containing 20 mole percent uranium phosphate was examined by X-ray diffraction to ascertain whether or not chemical changes had occurred during consolidation. The resulting diffraction pattern was compared with the patterns for the individual ingredients before processing and confirmed the presence of both uranium dioxide and the cubic form of uranium phosphate.

A fused quartz dilatometer was used to measure the thermal expansion properties of the test specimens. The dilatometer comprises a dial gage indicator calibrated in 0.0001-inch increments, an Invar dial indicator mount and a transparent fused quartz tube and rod assembly. The specimen is heated in a suitable electric furnace and the oven temperature is measured with a Chromel-Alumel thermocouple positioned within the quartz tube at the midpoint of the specimen. The dilatometer method can measure the change in length to an accuracy within ±2%.

Because of the oxidation tendency of uranium dioxide at elevated temperatures, it was necessary to shield the specimens of uranium dioxide-uranium phosphate mixtures from the atmosphere during the thermal expansion study. Such a shield was provided by inserting a small diameter inlet tube between the fused quartz rod and tube assembly of the dilatometer and purging argon over the specimen at a rate of 2½ liters per minute.

As a basis for a comparison of the results of the uranium dioxide-uranium phosphate mixtures, the values for the pure components are first presented. Cubic uranium phosphate has a cumulative thermal expansion coefficient of $1.5 \times 10^{-7}$ per degree C. for the temperature interval 20 to 1000° C. The expansion is positive in the range from room temperature to 400° C., with an average linear coefficient of expansion in this range of $48.8 \times 10^{-7}$ per degree C. From 400° C. to 1200° C. the expansion is negative, with an average linear coefficient of expansion in this range of $-36.5 \times 10^{-7}$ per degree C.

The expansion of uranium dioxide is $34 \times 10^{-4}$ in the temperature range of from 27° to 400° C., $77 \times 10^{-4}$ in the temperature range of from 27° to 800° C.; and $136 \times 10^{-4}$ in the temperature range from 27° to 1260° C. These result in an average coefficient or linear thermal expansion of $91.7 \times 10^{-7}$ per degree C. from 27° to 400° C., $107 \times 10^{-7}$ per degree C. from 27° to 800° C., and $129 \times 10^{-7}$ per degree C. from 27° to 1260° C.

The overall nature of the results of the tests of the uranium phosphate-uranium dioxide mixtures is illustrated in FIG. 1 which shows the variation of the linear thermal expansion coefficient as a function of composition. The coefficient illustrated is the average coefficient over the range of from 27° to 400° C. It will be seen that the coefficient is near zero at 20 mole percent uranium phosphate and is negative over the middle range of compositions. The curve shown in FIG. 1 is representative of the general nature of the results obtained for all temperature ranges up to about 1000° C. even though the curve is drawn specifically for the range of from 27° to 400° C.

It will be noted from an examination of FIG. 1 that bodies of quite low thermal expansion result from a broad range of compositions. For comparison, the value of uranium dioxide, namely $91.7 \times 10^{-7}$ per degree C. is somewhat typical of ceramic materials. Fused quartz, with a value of $5 \times 10^{-7}$ per degree C., is commonly considered to be one of the best low expansion materials over a broad temperature range. Any particular composition in the middle range of the uranium dioxide-uranium phosphate compositions can be spoken of properly as a low expansion material.

Figure 2:
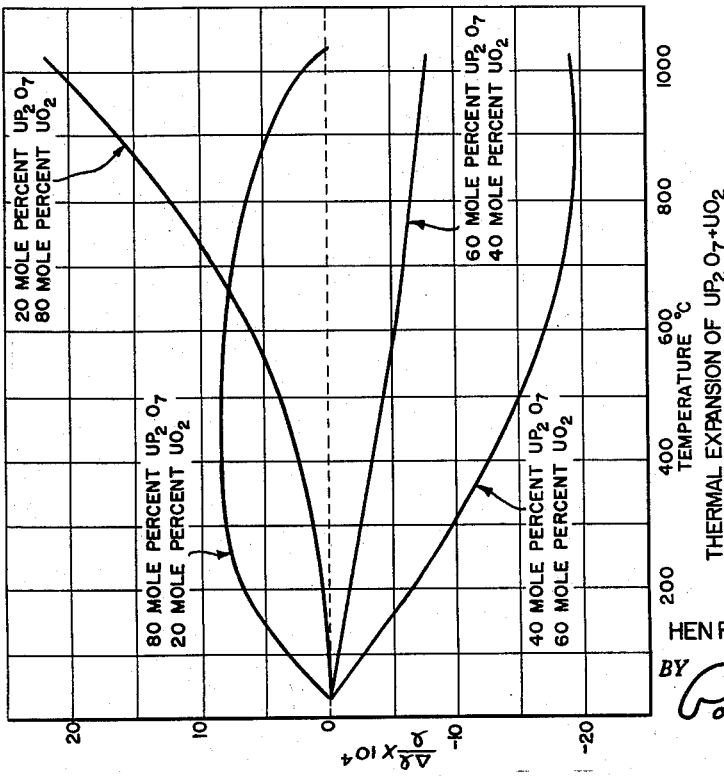
FIG. 2 is a graph showing the relationship between temperature and the thermal expansion of various compositions of uranium dioxide and uranium phosphate.

The results of the direct measurements of thermal expansion are shown in FIG. 2 which includes four curves severally for different proportions of uranium dioxide and uranium phosphate. The particular proportions of the composition representing each curve are indicated adjacent such curve.

From the foregoing, it will be seen that low expansion two phase ceramic bodies can be prepared by sintering uranium dioxide with uranium phosphate. With knowledge of the variation of the coefficient as a function of composition, it is evident that bodies possessing a predetermined coefficient of expansion can be prepared from a wide range of compositions.

What is claimed is:

1. A new composition of matter, consisting essentially of a mixture in the solid state of uranium dioxide and uranium phosphate.

2. As a new article of manufacture, a ceramic consisting essentially of a mixture of uranium dioxide and uranium phosphate.

3. A two phase ceramic, consisting essentially of a mixture of uranium dioxide and uranium phosphate.

4. A ceramic article having a low thermal expansion coefficient, consisting essentially of a sintered mixture of uranium dioxide and uranium phosphate.

No references cited.